United States Patent
Van Nederkassel et al.

(10) Patent No.: US 12,251,659 B2
(45) Date of Patent: Mar. 18, 2025

(54) COMPRESSOR INSTALLATION AND METHOD FOR DELIVERING A COMPRESSED GAS

(71) Applicant: ATLAS COPCO AIRPOWER, NAAMLOZE VENNOOTSCHAP, Wilrijk (BE)

(72) Inventors: Frederik Van Nederkassel, Wilrijk (BE); Tom Potters, Wilrijk (BE)

(73) Assignee: ATLAS COPCO AIRPOWER, NAAMLOZE VENNOOTSCHAP, Wilrijk (BE)

( * ) Notice: Subject to any disclaimer, the term of this patent is extended or adjusted under 35 U.S.C. 154(b) by 617 days.

(21) Appl. No.: 17/430,805

(22) PCT Filed: Apr. 20, 2020

(86) PCT No.: PCT/IB2020/053716
§ 371 (c)(1),
(2) Date: Aug. 13, 2021

(87) PCT Pub. No.: WO2020/217156
PCT Pub. Date: Oct. 29, 2020

(65) Prior Publication Data
US 2022/0161186 A1    May 26, 2022

Related U.S. Application Data

(60) Provisional application No. 62/837,762, filed on Apr. 24, 2019.

(30) Foreign Application Priority Data

Jun. 12, 2019 (BE) .................................. 2019/5376

(51) Int. Cl.
*B01D 53/26* (2006.01)
*B01D 53/04* (2006.01)
*B01D 53/06* (2006.01)

(52) U.S. Cl.
CPC ....... *B01D 53/261* (2013.01); *B01D 53/0438* (2013.01); *B01D 53/0446* (2013.01);
(Continued)

(58) Field of Classification Search
CPC .............. B01D 53/261; B01D 53/0438; B01D 53/0446; B01D 53/0454; B01D 53/06;
(Continued)

(56) References Cited

U.S. PATENT DOCUMENTS 3,785,755 A     1/1974   Novak
5,087,178 A *   2/1992   Wells ................. F04C 29/0007
                                                         95/123

(Continued)

FOREIGN PATENT DOCUMENTS

CN       107002683 A       8/2017
GB       1349733           4/1974
(Continued)

OTHER PUBLICATIONS

International Search Report and Written Opinion in corresponding PCT Application No. PCT/IB2020/053716, dated Aug. 4, 2020.
(Continued)

*Primary Examiner* — Qianping He
(74) *Attorney, Agent, or Firm* — BACON&THOMAS, PLLC (57) ABSTRACT

Compressor installation with a liquid-injected compressor device with a compressor element with an outlet pipe connected to an outlet of the compressor element, with a liquid separator in the outlet pipe which includes an inlet and an outlet for compressed gas and an outlet for separated (Continued)

liquid and with a dryer connected to the outlet pipe which uses a desiccant for drying compressed gas of the compressor device. The dryer is provided with a drying section and a regeneration section with an entry and an exit for regeneration gas. A regeneration pipe is connected to the entry and a heat exchanger is provided in the regeneration pipe with a primary section through which the regeneration gas is guided. A secondary section of the heat exchanger is mounted in the compressor device. The compressor installation is provided with means to regulate the amount of liquid injected in the compressor element.

16 Claims, 8 Drawing Sheets

(52) U.S. Cl.
CPC ......... *B01D 53/0454* (2013.01); *B01D 53/06* (2013.01); *B01D 2257/80* (2013.01); *B01D 2259/4009* (2013.01)

(58) Field of Classification Search
CPC ........ B01D 2257/80; B01D 2259/4009; B01D 53/26; B01D 53/263; B01D 50/00; B01D 5/0087; B01D 53/96; B01D 53/78; B01D 1/0047; B01D 53/1425; B01D 2259/402; B01D 2259/40086; B01D 19/0042; B01D 53/04; B01D 2259/40003; F25B 41/20; F25B 49/022; F25B 2600/2501; F25B 2600/2507; F25B 2600/13; F25B 2313/02741; F25B 2600/2515; F25B 2600/25; F04B 41/00; F04B 49/065; F04B 39/06; F04B 39/062; F04B 39/064; F04C 2270/195; F04C 29/021; F04C 29/04; F04C 29/0007; Y02P 80/15; Y10S 55/17; F04D 29/584

USPC ............................................................ 95/10
See application file for complete search history.

(56) References Cited

U.S. PATENT DOCUMENTS

| | | | |
|---|---|---|---|
| 2006/0257265 A1* | 11/2006 | Pettersson | F04B 41/06 417/53 |
| 2007/0034080 A1* | 2/2007 | Van Hove | B01D 53/265 62/93 |
| 2010/0233004 A1 | 9/2010 | Matsuzaka | |
| 2014/0069278 A1* | 3/2014 | Vermeer | F24F 3/1423 96/144 |
| 2016/0228814 A1* | 8/2016 | Van Minnebruggen | F04B 39/16 |
| 2017/0036160 A1* | 2/2017 | Kitchener | F26B 21/00 |
| 2018/0017061 A1* | 1/2018 | Able | F04C 29/0092 |

FOREIGN PATENT DOCUMENTS

| | | |
|---|---|---|
| WO | 2007079553 A1 | 7/2007 |
| WO | WO2016041026 A1 | 3/2016 |
| WO | 2016094968 A1 | 6/2016 |
| WO | 2019093181 A1 | 5/2019 |

OTHER PUBLICATIONS

Belgium Search Report in corresponding Belgium Application No. 201905376, dated Feb. 17, 2020.
Singapore Written Opinion in corresponding Singapore Application No. 11202111042Y, dated Jan. 2, 2023.
Examination Report cited in Canadian Appln. No. 3,130,096 dated Oct. 7, 2024.

* cited by examiner

COMPRESSOR INSTALLATION AND METHOD FOR DELIVERING A COMPRESSED GAS

The present invention relates to a device for supplying compressed gas.

BACKGROUND OF THE INVENTION

Compressor installations are already known which are provided with a compressor device, an outlet pipe for compressed gas and a dryer connecting to said outlet pipe of the type which uses a desiccant for drying the compressed gas coming from the compressor device, whereby the dryer is provided with a drying section and a regeneration section.

The drying section is provided with a desiccant for drying the compressed gas which is guided through it and is provided with an entry which connects to said outlet pipe of the compressor device, and with an exit which also serves as the compressor installation outlet for supplying compressed and dried gas to a downstream network to which compressed gas consumers can be connected.

When the compressed gas to be dried flows through the desiccant in the drying section, moisture from the compressed gas is taken up into the desiccant by adsorption or absorption.

In the regeneration section, as is known, desiccant is regenerated which has already been used for drying compressed gas and which is saturated or partially saturated with moisture extracted from the gas to be dried.

The desiccant in the regeneration section is hereby regenerated by means of a regeneration gas which is guided through it via an entry and an exit of said regeneration section.

For liquid-free compressor devices, a so-called "heat of compression" dryer (HOC-dryer) can be used, whereby the regeneration gas is directly tapped off from said compressor device outlet pipe, for example at the compressor device outlet.

The tapped off regeneration gas has a sufficiently high temperature to be able to take up moisture from the desiccant to be regenerated.

A disadvantage of such known device is that the regeneration gas has a high absolute humidity and that after regeneration the desiccant still contains a certain amount of moisture, such that when it is used at a later stage for drying gas, it has a reduced capacity to take up moisture and therefore needs to be regenerated again sooner.

In addition, liquid-injected compressor devices do not lend themselves to the use of compression heat for regeneration, because the temperature at the compressor device outlet will typically be much lower here, such that the compressed gas would not be able to dry the desiccant to be regenerated, or not sufficiently.

Another disadvantage in liquid-injected compressor devices is that the compressed gas at the outlet of the compressor device contains a certain amount of liquid which can contaminate the desiccant.

A solution to avoid the contamination of the desiccant is to guide the entire flow of compressed gas coming from the compressor device to the drying section, after the compressed gas is first cooled and passed through a liquid separator.

Subsequently, regeneration gas can be tapped off at the drying section outlet, said regeneration gas being heated by means of a heat exchanger, for example by using the heat of the compressed gas at the compressor device outlet or by using the heat of the injected liquid.

A problem that occurs in such approach is the fact that, for the operation of the compressor device and the lifetime of the liquid, the temperature of the liquid at the compressor device outlet must be kept as low as possible, preferably under 80° C., whereas, to be able to properly regenerate the desiccant, the temperature of the regeneration gas is preferably higher than 100° C. and even more preferable higher than 120° C.

SUMMARY OF THE INVENTION

The purpose of the present invention is to provide solution to one or more of the aforementioned and other disadvantages.

To this end the present invention relates to a compressor installation provided with a liquid-injected compressor device with at least one liquid-injected compressor element, an outlet pipe connected to an outlet of the compressor element, whereby a liquid separator is mounted in the outlet pipe which comprises an inlet and an outlet for compressed gas and an outlet for separated liquid and with a dryer connected to said outlet pipe of the type that uses a desiccant for drying compressed gas coming from the compressor device, whereby the dryer is provided with a drying section and a regeneration section with an entry and an exit for regeneration gas, whereby a regeneration pipe is connected to the entry of the regeneration section, whereby in said regeneration pipe a heat exchanger is provided for heating the regeneration gas with a primary section through which the regeneration gas is guided, characterised in that a secondary section of said heat exchanger is mounted in the compressor device and that the compressor installation is further provided with means to regulate the amount of liquid injected in the compressor element.

This provides the advantage that by regulating the liquid injection in the compressor element, the temperature at the outlet of the compressor element, of both the liquid and the gas, can be regulated.

By, for example, injecting less liquid, the temperature will be higher, such that more heat is available to heat the regeneration gas.

By integrating said secondary section in the outlet pipe or allowing it to connect to said outlet for the separated liquid, the heat of the gas, respectively the liquid, can be used for heating the regeneration gas.

Another advantage is that by means of the heat exchanger, heat will be removed, such that there is no need for a separate liquid cooler or aftercooler for the compressed gas for removing this heat or that said cooler can be much smaller in size.

The operation of such compressor installation is comparable with the known devices for drying compressed gas, whereby the compressed gas is guided through the drying section.

Said dryer can be executed in different ways and can for example consist of one housing in which both the drying section and the regeneration section are located or can consist of two or more vessels at least one of which forms a drying section and at least one forms the regeneration section.

The means to regulate the amount of liquid injected in the compressor element or in other words the means to regulate the liquid injection, can be executed in different ways, for example by an adjustable valve or adjustable nozzle.

In a practical embodiment, the compressor installation is provided with a control unit to control said means, whereby the control unit will regulate the amount of injected liquid based on one or more of the following criteria:
- the required temperature of the gas or the liquid at the outlet;
- the required temperature of the gas at the inlet or the outlet of the regeneration section;
- the required dew point;
- the temperature and/or the humidity of the environment;
- the temperature, humidity and/or pressure at the inlet of the dryer;
- the stage of the dryer;
- the run time and/or the loaded and/or unloaded time of the compressor device;
- the speed of the drive.

It is also possible that the control unit will regulate the amount of injected liquid by reducing the liquid injection at regular periods of for example one hour, over a fixed time, for example ten minutes, such that the temperature is temporarily increased at the outlet to thus be able to properly regenerate the desiccant at regular periods.

If the desiccant is mounted in a dryer which comprises different vessels, the liquid injection can be reduced at the end of the regeneration step of a vessel to increase the temperature for a final regeneration.

Preferably, the liquid injection will be regulated based on the temperature of the regeneration gas required for drying the desiccant.

The invention also relates to a method for supplying compressed gas coming from a liquid-injected compressor device with at least one liquid-injected compressor element with a compressed gas outlet, whereby the compressed gas is guided through a desiccant in a drying section for drying the compressed gas and whereby said desiccant is subsequently regenerated in a regeneration section by means of a regeneration gas which is guided through said regeneration section, characterised in that the method comprises the step of heating the regeneration gas before it is guided through said regeneration section, using the heat at the liquid-injected compressor device outlet and whereby the method further comprises the step of regulating the amount of liquid that is injected in the compressor element.

An advantage of such method is that a sufficiently high temperature can be reached for the regeneration gas, such that all or practically all the moisture can be adsorbed or absorbed, considering that by regulating the amount of liquid which is injected the temperature at the outlet of the compressor device can be controlled. In this way it is possible to ensure sufficient heat is available such that the regeneration gas is sufficiently heated.

Preferably, the amount of injected liquid is regulated based on one or more of the following criteria:
- the required temperature of the gas or the liquid at the outlet;
- the required temperature of the gas at the inlet or the outlet of the regeneration section;
- the required dew point;
- the temperature and/or the humidity of the environment;
- the temperature, humidity and/or pressure at the inlet of the dryer;
- the stage of the dryer;
- the run time and/or the loaded and/or unloaded time of the compressor device;
- the speed of the drive.

It is also possible to regulate the amount of injected liquid by reducing the liquid injection at regular periods of for example one hour, over a fixed time, for example ten minutes, such that the temperature is temporarily increased at the outlet to thus be able to properly regenerate the desiccant at regular periods.

If the desiccant is mounted in a dryer which comprises different vessels, the liquid injection can be reduced at the end of the regeneration step of a vessel to increase the temperature for a final regeneration.

In a preferred embodiment a device according to the invention is used to execute the method.

BRIEF DESCRIPTION OF THE DRAWINGS

With the intention of better showing the characteristics of the invention, a few preferred variants of a compressor installation according to the invention as well as a method according to the invention for supplying compressed gas are described hereinafter by way of an example without any limiting nature, with reference to the accompanying drawings, wherein:

FIG. 6 shows an alternative embodiment of FIG. 5,

DETAILED DESCRIPTION OF THE INVENTION

Figure 1:
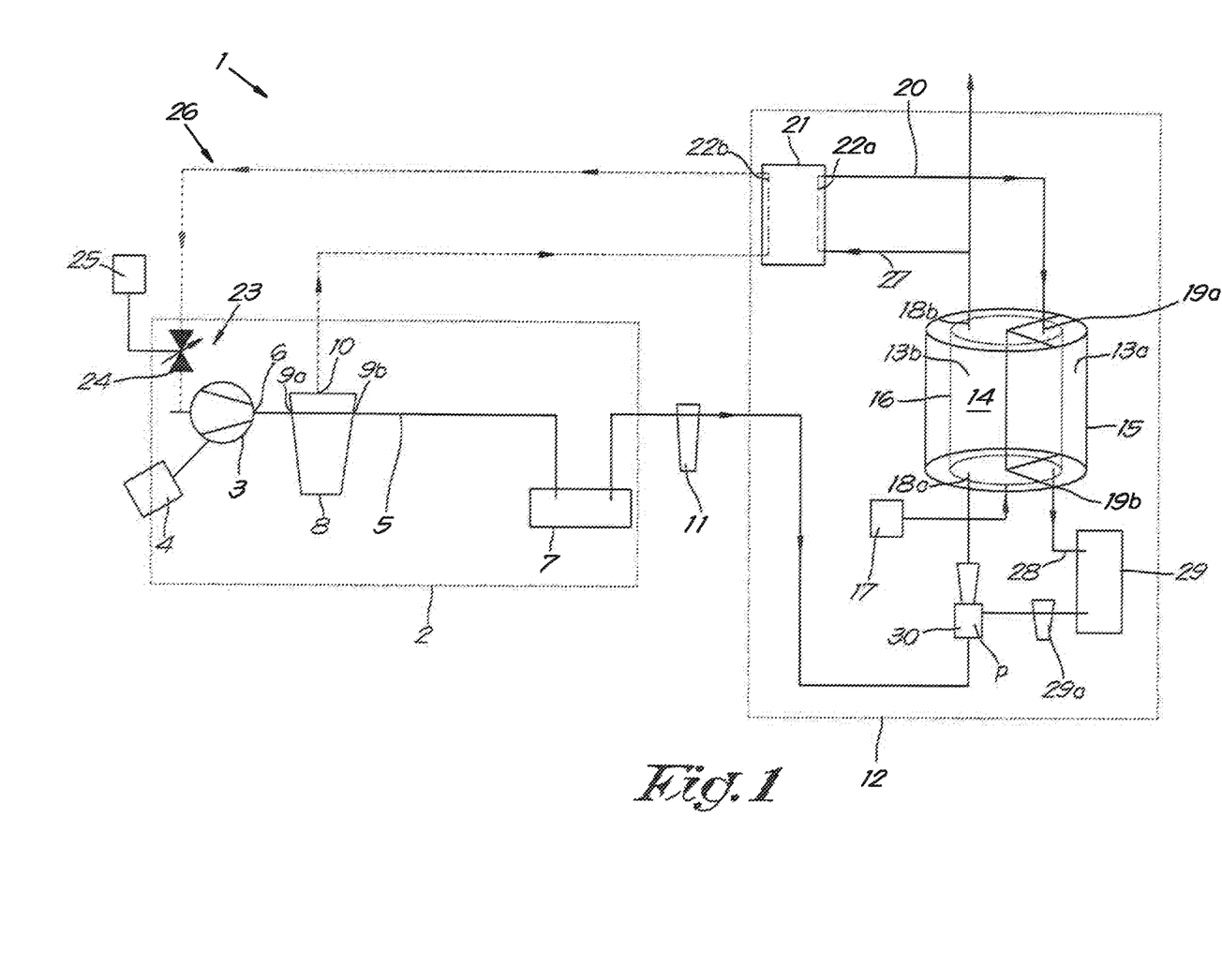
FIG. 1 schematically shows a compressor installation according to the invention.

The compressor installation 1 according to the invention schematically shown in FIG. 1 comprises a compressor device 2 with in this case one compressor element 3 which is driven by a drive 4 in this case.

The drive 4 is for example an electric motor, but can also be another type of drive such as a thermal motor, a turbine wheel or the like.

It is not excluded that the compressor device 2 comprises more than one compressor element 3 and/or more than one drive 4.

The compressor device 2 comprises an outlet pipe 5 which is connected to the outlet 6 of the compressor element 3.

An aftercooler 7 is mounted in said outlet pipe 5 for cooling the compressed air, however, this is not necessary for the invention. Downstream from said aftercooler 7, a liquid separator can possibly be mounted in the outlet pipe 5.

According to the invention, the compressor device 2 is a liquid-injected compressor device 2, whereby a liquid, for example oil, is injected in the compressor element 3. It is also possible that another type of liquid is injected, such as water or a polymer.

In said outlet pipe 5, upstream from said aftercooler 7, an oil separator 8 is mounted with a compressed gas inlet 9a and outlet 9b and an outlet 10 for separated oil.

Downstream from the aftercooler 7, a filter 11 is also mounted in the outlet pipe 5.

The compressor device 1 further comprises a so-called regeneration section 13a, said section being part of a dryer 12, which in addition to the regeneration section 13a also comprises a drying section 13b.

Both in the regeneration section 13a and in the drying section 13b, a desiccant 14 has been added.

In the example shown, the dryer 12 is provided with a housing 15 within which the drying section 13b and the regeneration section 13a are located.

A drum 16 containing the desiccant is arranged in the housing 15, said drum 16 being connected to driving means 17 such that the desiccant 14 can be moved successively through the drying section 13b and the regeneration section 13a.

The desiccant 14 in the drying section 13b will be used for drying the compressed gas which is guided through it and to this end the drying section 13b is in this case provided with an entry 18a which connects to said outlet pipe 5 of the compressor device 2 and with an exit 18b which serves as an outlet for supplying compressed and dried gas.

In this case the entire flow of compressed gas coming from said compressor element 3 is guided to the entry 18a of the drying section 13b.

According to the invention the regeneration section 13a is provided with an entry 19a and an exit 19b and a regeneration pipe 20 connected to the entry for guiding a regeneration gas through the regeneration section 13a to be able to regenerate moist desiccant 14 located in the regeneration section 13a.

A heat exchanger 21 is provided in this regeneration pipe 20 to heat the regeneration gas with a primary section 22a through which the regeneration gas is guided, whereby the secondary section 22b of this heat exchanger 21 is mounted in the compressor device 2.

In the example of FIG. 1 the outlet 10 for separated liquid is connected to the secondary section 22b of the heat exchanger 21.

This means that the warm separated oil is guided to the secondary section 22b, such that this oil can heat the regeneration gas that flows through the primary section 22a.

According to the invention the compressor installation 1 is further provided with means 23 to regulate the amount of liquid injected in the compressor element 3.

These means 23 can be executed in different ways. In this case by an adjustable valve 24, which can control the supply of oil. This could also be an adjustable nozzle.

The adjustable valve 24 is provided with a control unit 25 to control it.

As can be deduced from FIG. 1, the oil separator 8, the secondary section 22b of the heat exchanger 21 and said means 23 form an injection circuit 26. It is not excluded that in this injection circuit 26, for example downstream from the heat exchanger 21, an oil cooler is mounted.

In the example shown, the regeneration pipe 20 is connected to the exit 18b of the drying section 13b via a tap off pipe 27 for tapping off regeneration gas at the exit 18b of the drying section 13b. In other words, part of the dried compressed gas is used as regeneration gas.

The exit 19b of the regeneration section 13a is connected via a return pipe 28 to the outlet pipe 5 of the compressor device 2 at a point P near the entry 18a of the drying section 13b.

A cooler 29 is mounted in said return pipe 28 for cooling the regeneration gas after regenerating as well as a liquid separator 29a to be able to remove possibly condensed liquid.

The outlet pipe 5 is also connected to the return pipe 28 via a venturi 30.

Instead of a venturi ejector, a so-called blower or booster could also be used for the recombination of the used regeneration gas with the gas to be dried.

The operation of the compressor installation 1 is very simple and as follows.

The compressor element 3 will compress gas, for example air, in the known way.

During the operation, oil will be injected in the compressor element 3 for the lubrication, cooling and sealing thereof.

The temperature of the gas and the oil at the outlet 6 of the compressor element 3 will, among other things, depend on the amount of oil injected.

Via the control unit 25 the amount of oil injected by the adjustable valve 24 will be regulated based on the temperature of the regeneration gas needed for drying the desiccant 14.

A minimum temperature of the oil at the outlet 6 will correspond with this required temperature of the regeneration gas, for example at least 100° C.

The control unit 25 thus ensures that just enough liquid is injected such that the oil at the outlet 6 reaches a temperature of 100° C.

The compressed gas will pass via the outlet pipe 5 through the oil separator 8 for separating the injected oil from the compressed gas.

The gas subsequently passes through the aftercooler 7, whereby the compressed gas will cool to approximately 30° C., possibly through a liquid separator after the aftercooler to be able to separate the condensed liquid and finally also through the filter 11 for filtering out any last impurities.

The outlet pipe 5 will guide all the cooled and purified compressed gas to the entry 18a of the drying section 13b of the dryer.

As the gas passes through the drying section 13b, the desiccant 14 will take up moisture from the gas. In other words: the desiccant 14 will become moist.

When the gas that is now dry leaves the drying section 13b, it will be transported to a network of consumers for example (not shown in the figure).

A part of this dry gas will be guided to the regeneration pipe 20 via the tap off pipe 27.

This so-called regeneration gas will hereby pass via the primary section 22a of the heat exchanger, 21 to heat the regeneration gas.

Via the heat exchanger 21, the regeneration gas will be heated using the warm oil.

The regeneration gas will be heated from approximately 30° C. to approximately 100° C., which is sufficient for regeneration.

At the same time the oil will be cooled from 100° C. to approximately 35° C. and be reinjected via the adjustable valve 24 into the compressor element 3.

Via the regeneration pipe 20, the regeneration gas is guided to the entry 19a of the regeneration zone 13a where it will flow through the moist desiccant 14 in the regeneration zone 13a.

The regeneration gas will regenerate the desiccant 14, this means: extract moisture from the moist desiccant 14 or the desiccant 14 itself will be dried.

Subsequently, the dried desiccant 14 will be moved to the drying section 13b by means of the driving means 17 of the drum 16, while at the same time moist desiccant 14 ends up in the regeneration section 13a.

The regeneration gas which after passage through the regeneration section 13a contains moisture and has a temperature of approximately 70° C., will be guided via the return pipe 28 to the entry 18a of the drying section 13b and thus dried. It will hereby pass via the cooler 28 and be cooled to approximately 30° C. and via the liquid separator 29a before it is recombined via the venturi 30 with the compressed gas coming from the compressor device 2.

Although in the example described above the means were regulated such that the required temperature of the regeneration gas is obtained, it is not excluded that regulating occurs on the basis of one or more other parameters.

The amount of liquid injected can also be regulated based on environment parameters or the dew point of the gas.

Parameters of the compressor device 2 or of the dryer 12 can also be taken into account for regulating the liquid injection.

Figure 2:
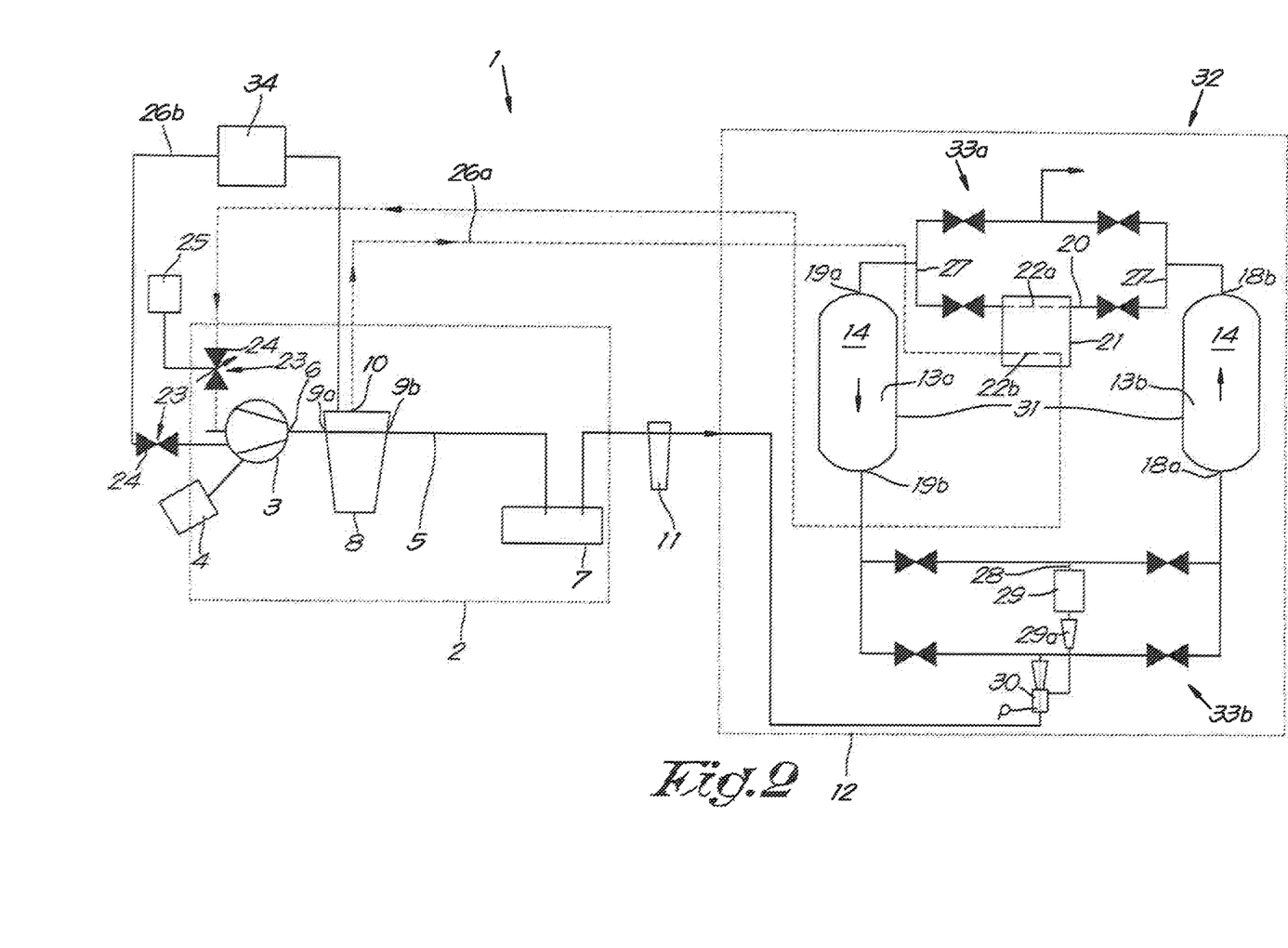
FIG. 2 shows an alternative embodiment of FIG. 1.

FIG. 2 shows a variant according to FIG. 1, whereby in this case the dryer 12 is executed differently.

Instead of a rotating or revolving drum 16, the dryer 12 now comprises a number of vessels 31 that are filled with the desiccant 14.

In the example shown there are two vessels 31, but it can also be three, four or more vessels 31, at least one vessel 31 of which forms the drying section 13b and at least one vessel forms the regeneration section 13a.

In addition to said vessels 31, the dryer 12 further comprises a valve system 12 which connects the outlet pipe 5, the regeneration pipe 20 and in this case also at least part of the return pipe 28 and the tap off pipe 27 to said vessels 31.

Said valve system 32 comprises two separate blocks 33a, 33b.

Said valve system 32 is a system of different pipes and valves that can be regulated such that at least one vessel 31 is always regenerated, while the other vessels 31 dry the compressed gas, whereby by regulating the valve system 32 the vessels 31 are successively regenerated in turn.

The cooler 29, the venturi 30, the return pipe 28 and a section of the tap off pipe 27 are integrated in the valve system 32, but this is not necessary for the invention.

The compressor installation 1 in FIG. 2 is also provided with two injection circuits 26a, 26b, whereby a first injection circuit 26a runs from the outlet 10 for the separated liquid of the liquid separator 8 to the compressor element 3 and a second injection circuit 26b runs from the outlet 10 for the separated liquid of the liquid separator 8 to the bearings of the compressor device 2.

In this case the secondary section 22b of said heat exchanger 21 is mounted in the first injection circuit 26s.

An oil cooler 34 is mounted in the second injection circuit 26b.

In this case an adjustable valve 24 is mounted in both injection circuits 26a, 26b. However, this is not necessary for the invention.

In this way the separated oil will be divided, whereby part is injected via the heat exchanger 21 in the compressor element 3 and another part is sent via the oil cooler 34 to the bearings.

With the adjustable valves 24 both the amount of oil to the compressor element 3 and to the bearings can be regulated.

For the rest the operation is analogue to the operation of the compressor installation 1 in FIG. 1 described above.

It is clear that in FIG. 1 and in all embodiments described below two injection circuits 26a, 26b can also be applied.

Figure 3:
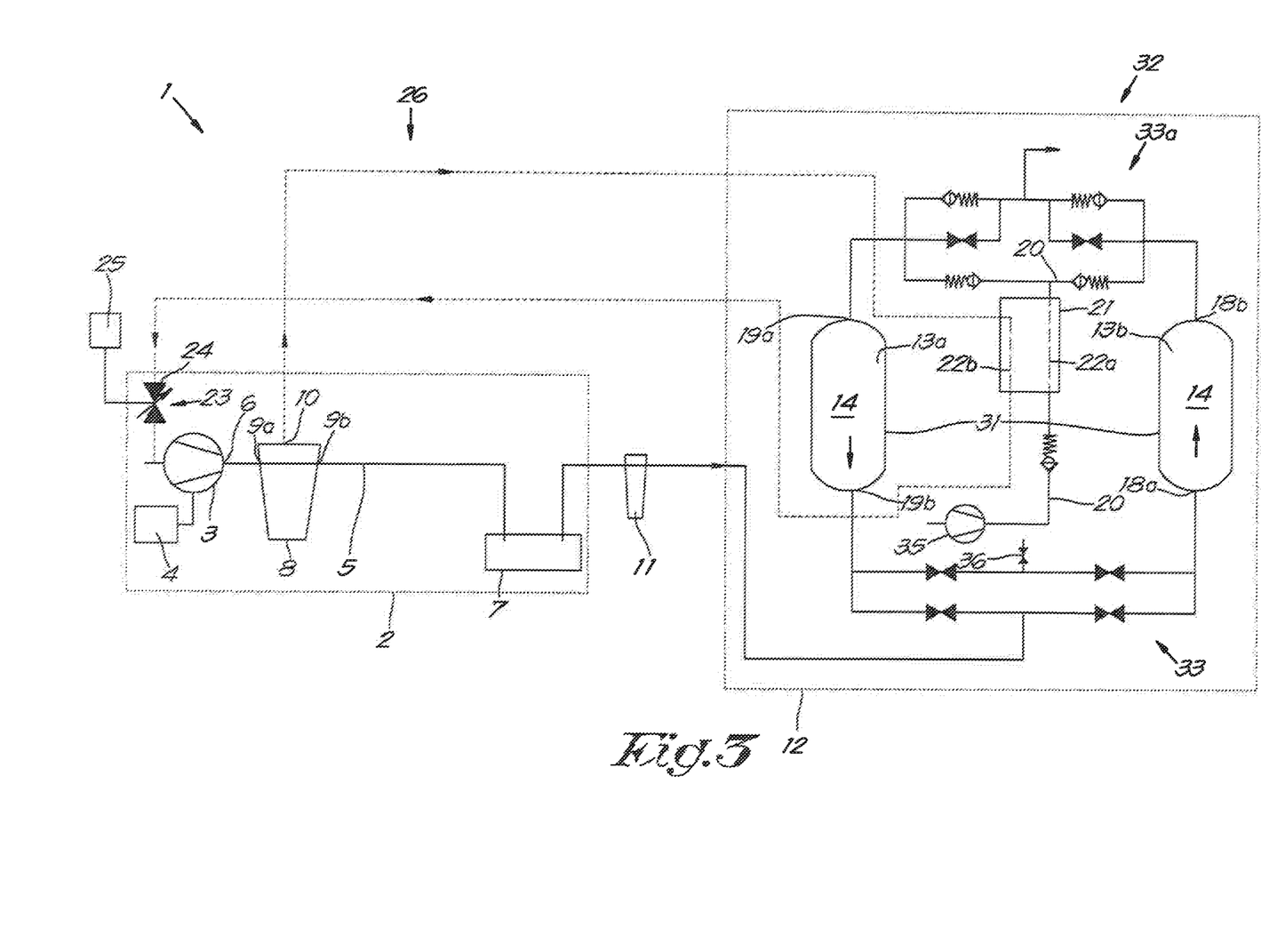
FIGS. 3 and 4 show variants of FIG. 2.

FIG. 3 shows a variant of FIG. 2, whereby in this case the regeneration gas is not tapped off from the dried, compressed gas, but comes from an external source 35.

The regeneration gas is no longer transported to the inlet 18a of the drying section 14b via a return pipe 28 either, but after regeneration of the desiccant will be removed or blown off, for example by means of a blow-off valve 36.

Also, there is only one injection circuit 26, as shown in FIG. 1.

The liquid separator 29a is absent in this embodiment.

Figure 4:
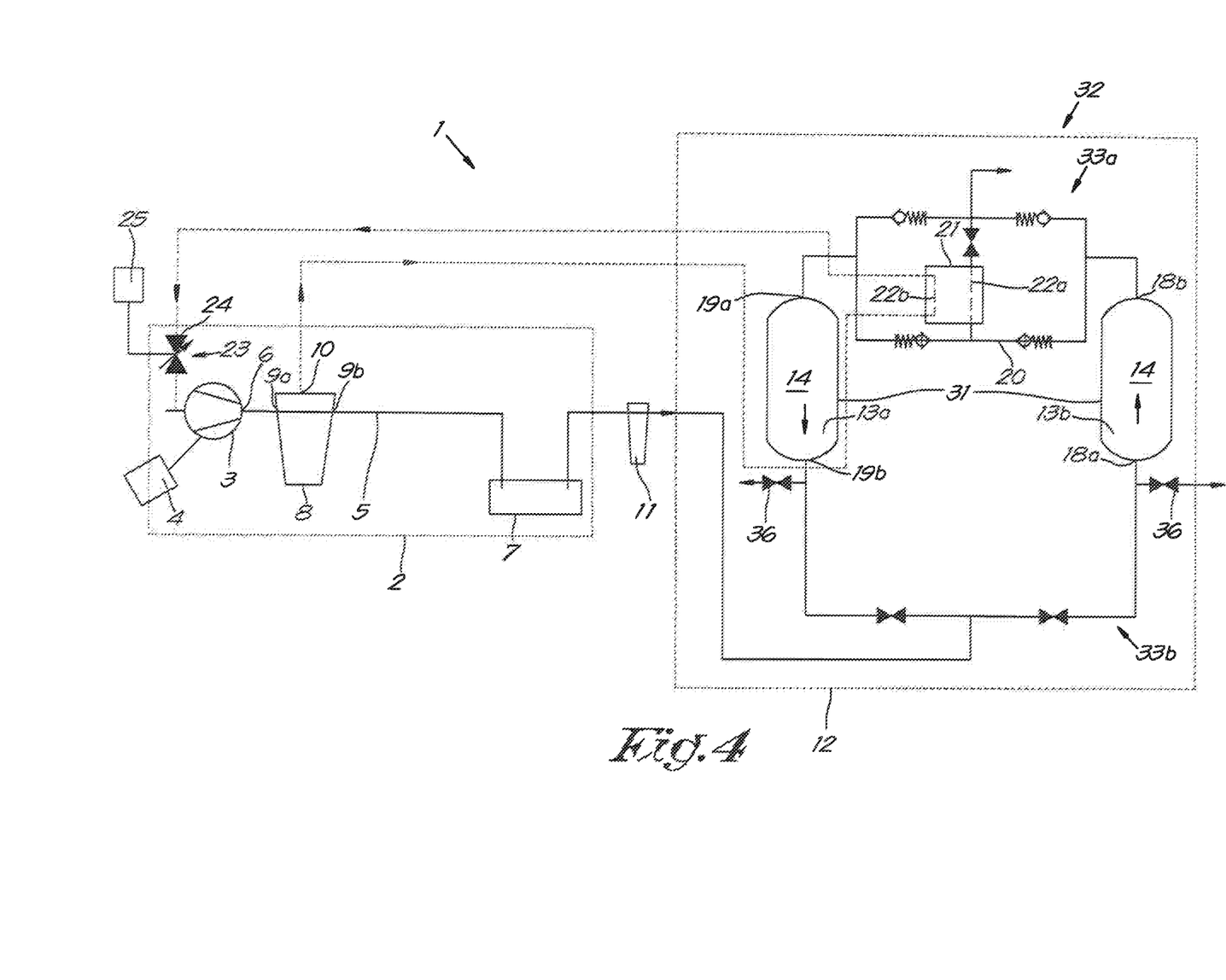

FIG. 4 shows another embodiment, whereby in this case the regeneration gas is tapped off again at the exit 18b of the drying section 13b, as shown in FIG. 2, but whereby the regeneration gas is blown off after regeneration, for example by means of a blow-off valve 36, as shown in FIG. 3. In this case too there is only one injection circuit 26, as shown in FIG. 1.

The liquid separator 29a is also absent in FIG. 4.

For the rest the embodiments of FIGS. 3 and 4 are identical to FIG. 2.

Figure 5:
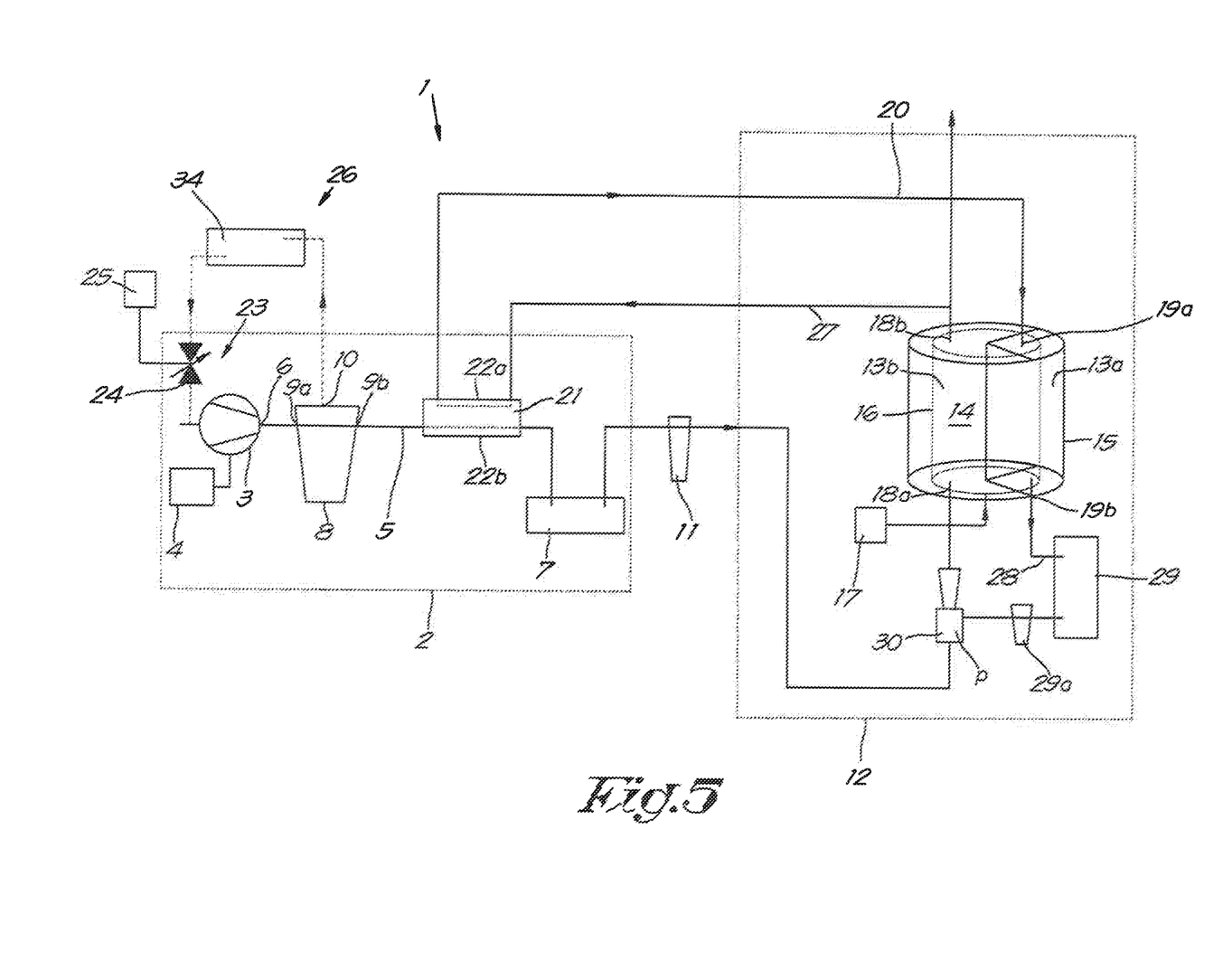
FIG. 5 schematically shows a compressor installation according to the invention.

FIG. 5 shows a variant of FIG. 1, whereby in this case the primary section 22a of the heat exchanger 21 is mounted in the outlet pipe 5, downstream from the liquid separator 8.

The outlet 10 for separated oil of the oil separator 8 is connected with an oil cooler 34 which in turn is connected with the adjustable valve 24.

The regeneration gas will be heated via the heat exchanger 21 using the heat of the compressed gas.

The separated oil will be cooled with the oil cooler 34.

For the rest, the operation is analogue to FIG. 1.

FIG. 6 shows a variant of FIG. 1, whereby the dryer 12 in this case is executed as in FIGS. 2 to 4.

Instead of a rotating or revolving drum 16, the dryer 12 now comprises a number of vessels 31 that are filled with the desiccant 14.

In the example shown there are two vessels 31, but it can also be three, four or more vessels 31, at least one vessel 31 of which forms the drying section 13b and at least one vessel 31 forms the regeneration section 13a.

In addition to said vessels 31, the dryer 12 further comprises a valve system 32 which connects the outlet pipe 5, the regeneration pipe 20, the return pipe 28 and the tap off pipe 27 to said vessels 31.

Said valve system 32 comprises two separate blocks 33a, 33b.

Said valve system 32, as shown in FIG. 2, is a system of different pipes and valves that can be adjusted such that at least one vessel 31 is always regenerated, while the other vessels 31 dry the compressed gas, whereby in this case by regulating the valve system 32 the vessels 31 are successively regenerated in turn.

The cooler 29, the venturi 30, the return pipe 28 and a section of the tap off pipe 27 are integrated in the valve system 32, however, this is not necessary for the invention.

The liquid separator 29a is absent in this case.

For the rest the operation is analogue to the operation the compressor installation 1 in FIG. 5 described above.

Figure 7:
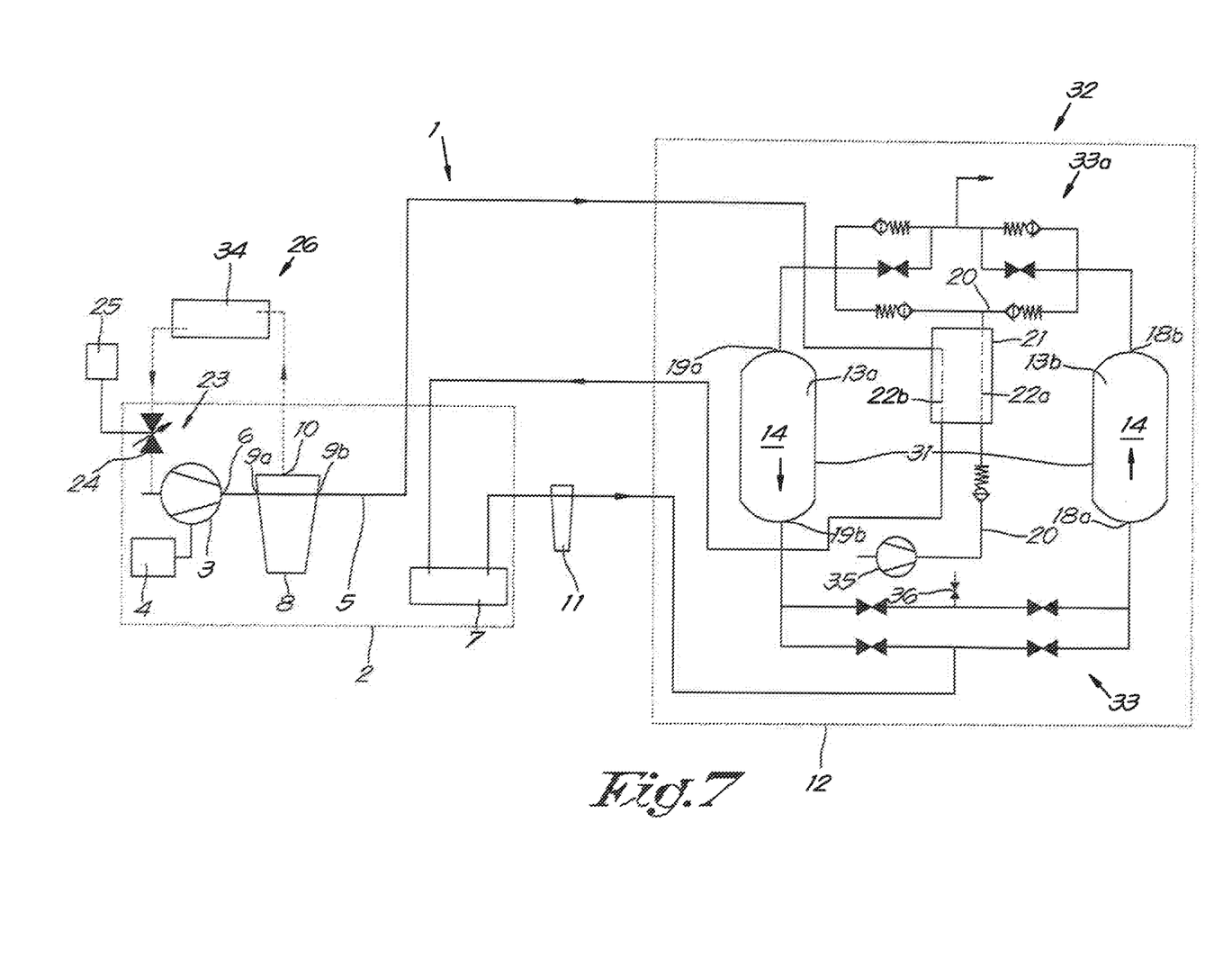
FIGS. 7 and 8 show variants of FIG. 6.

FIG. 7 shows a variant of FIG. 6, whereby in this case the regeneration gas is not tapped off from the dried, compressed gas, but comes from an external source 35, as shown in FIG. 3.

The regeneration gas is no longer transported via a return pipe 28 to the inlet 18a of the drying section 13b either, but after regeneration of the desiccant 14 will be removed or blown off, for example by means of a blow-off valve 36.

The liquid separator 29a is absent in this case.

Figure 8:
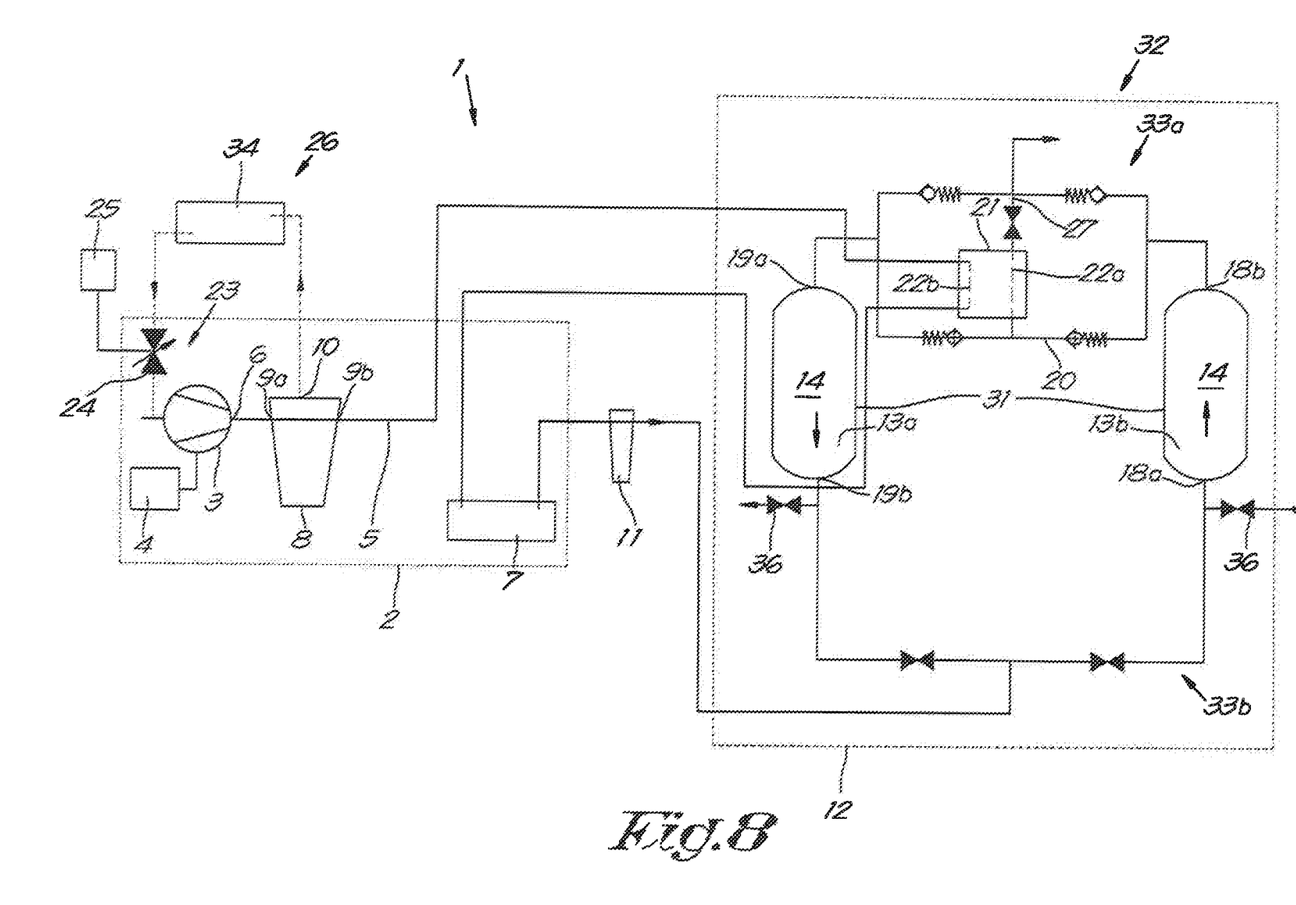
Figure 9:
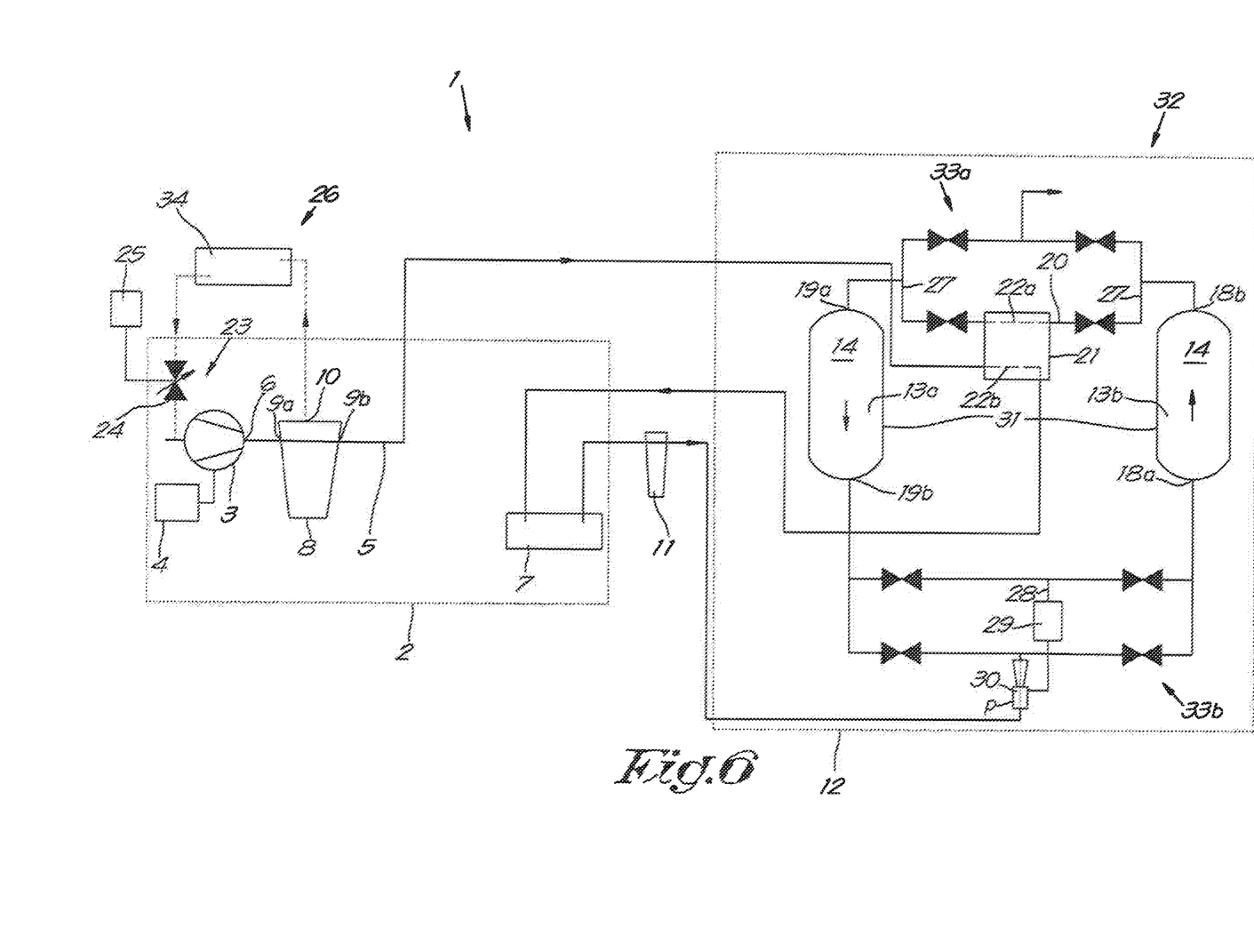

FIG. 8 shows another embodiment, whereby in this case the regeneration gas is tapped off again at the exit 18b of the drying section 13b, as shown in FIG. 6, but whereby the regeneration gas is blown off after regeneration, for example by means of a blow-off valve 36, as shown in FIG. 7. This corresponds with the situation as shown in FIG. 4.

The liquid separator 29a is also absent in this case.

For the rest the embodiments of FIGS. 7 and 8 are identical to FIG. 6.

It should be clear that the specific execution of the valve system 32 in FIGS. 2 to 4 and 6 to 8 is not restrictive for the invention and that it can be realised in many different ways.

The present invention is by no means limited to the embodiments described as an example and shown in the figures, however, such a compressor installation and method according to the invention for supplying compressed gas can be realised according to different variants, without departing from the scope of the invention.

The invention claimed is:

1. A compressor installation comprising with a compressor device for compressing a gas, the compressor device including:
   at least one liquid-injected compressor element into which a liquid is injected for lubrication, cooling, and sealing, and
   an outlet pipe connected to an outlet of the at least one liquid-injected compressor element for receiving compressed gas coming from the liquid-injected compressor element,
   a liquid separator mounted in the outlet pipe for separating liquid from the compressed gas coming from the at least one liquid-injected compressor element, which comprises a compressed gas inlet and a compressed gas outlet for the compressed gas coming from the at least one liquid-injected compressor element, and a liquid outlet for said liquid which has been separated by the liquid separator from the compressed gas coming from the at least one liquid-injected compressor element, and
   a dryer connected to said outlet pipe and configured to use a desiccant to dry the compressed gas coming from the compressed gas outlet of the liquid separator, and
   a heat exchanger for transferring heat from the compressor device to a regeneration gas for regenerating a desiccant,
   wherein the dryer is provided with a drying section with an entry for the compressed gas coming from the liquid separator and an exit for the dried compressed gas that has been dried in the drying section, and a regeneration section with an entry and an exit for the regeneration gas,
   wherein the regeneration gas is one of:
      a portion of the dried compressed gas that has passed through the exit of the drying section and that is guided to the entry of the regeneration section via a regeneration pipe connected to the entry of the regeneration section, or
      provided by an external source connected to the regeneration pipe,
   wherein the heat exchanger has a secondary section connected to the liquid outlet of the liquid separator, and a primary section provided in the regeneration pipe for transferring heat from the compressor device to the regeneration gas,
   wherein-the compressor installation is further provided with liquid injection regulation means to regulate an amount of liquid injected in the at least one liquid-injected compressor element.

2. The compressor installation according to claim 1, wherein the secondary section of the heat exchanger is mounted in the outlet pipe, downstream from the compressed air outlet of the liquid separator.

3. The compressor installation according to claim 1, wherein said liquid injection regulation means are formed by an adjustable valve or adjustable nozzle.

4. The compressor installation according to claim 1, wherein the compressor installation is provided with a control unit for controlling said liquid injection regulation means, wherein the control unit will regulate the amount of liquid injected based on one or more of the following criteria:
   a required temperature of a gas or a liquid at the outlet of the at least one liquid-injected compressor element;
   a required temperature of the gas at the entry or the exit of the regeneration section;
   a required dew point;
   an environmental temperature and/or an environmental humidity;
   a temperature, humidity and/or pressure at an inlet of the dryer;
   a stage of the dryer;
   a run time and/or a loaded time and/or an unloaded time of the compressor device;
   a speed of a drive of the dryer.

5. The compressor installation according to claim 1, wherein the compressor installation is provided with a control unit for controlling said liquid injection regulation means, wherein the control unit will regulate the amount of liquid injected by regularly reducing the amount of liquid injected over a fixed period.

6. The compressor installation according to claim 1, wherein the compressor device is provided with two injection circuits, wherein a first injection circuit runs from the liquid outlet for the separated liquid of the liquid separator to the at least one liquid-injected compressor element and a second injection circuit runs from the liquid outlet for the separated liquid of the liquid separator to bearings of the compressor device.

7. The compressor installation according to claim 6, wherein the secondary section of said heat exchanger is mounted in the first injection circuit.

8. The compressor installation according to claim 1, wherein said at least one liquid-injected compressor element is driven by a drive.

9. The compressor installation according to claim 1, wherein the compressor installation is configured such that an entire flow of compressed gas coming from said at least one liquid-injected compressor element is guided to an entry of said drying section.

10. The compressor installation according to claim 1, wherein a tap off pipe is provided at an exit of the drying section which connects to said regeneration pipe for tapping off regeneration gas at the exit of the drying section.

11. The compressor installation according to claim 1, wherein the exit of the regeneration section is connected via a return pipe to the outlet pipe of the compressor device at a point near an entry of the drying section.

12. The compressor installation according to claim 11, wherein in said return pipe a cooler is mounted.

13. The compressor installation according to claim 11, wherein the return pipe is connected to the outlet pipe via a venturi.

14. The compressor installation according to claim 1, wherein the dryer is provided with a housing within which the drying section and the regeneration section are located, wherein in the housing a drum is arranged containing the desiccant.

15. The compressor installation according to claim 1, wherein the dryer comprises a number of vessels filled with the desiccant, at least one vessel of which forms the drying section and at least one vessel forms the regeneration section, wherein the dryer further comprises a valve system which connects the outlet pipe and the regeneration pipe with said vessels, wherein said valve system is such that at least one vessel is always regenerated, while the other vessels dry the compressed gas, wherein by regulating the valve system the vessels are each in turn successively regenerated.

16. The compressor installation according to claim 1, wherein an aftercooler is mounted in the outlet pipe.

\* \* \* \* \*